(12) United States Patent
Park

(10) Patent No.: US 6,187,524 B1
(45) Date of Patent: Feb. 13, 2001

(54) PHOTOGRAPHIC POLYESTER FILM AND MANUFACTURING METHOD THEREFOR

(75) Inventor: Yong-in Park, Suwon (KR)

(73) Assignee: SKC Co., Ltd. (KR)

(*) Notice: Under 35 U.S.C. 154(b), the term of this patent shall be extended for 0 days.

(21) Appl. No.: 09/268,716

(22) Filed: Mar. 17, 1999

(30) Foreign Application Priority Data

| Mar. 18, 1998 | (KR) | 98-9223 |
| May 22, 1998 | (KR) | 98-18530 |
| Aug. 27, 1998 | (KR) | 98-34885 |

(51) Int. Cl.[7] ............................................. G03C 1/76
(52) U.S. Cl. .................... 430/531; 430/637; 430/906; 428/423.7
(58) Field of Search ................... 430/637, 906, 430/531; 428/423.7

(56) References Cited

U.S. PATENT DOCUMENTS

| 4,810,321 | 3/1989 | Wank et al. |
| 5,610,232 | 3/1997 | Duan et al. |
| 5,707,791 | * 1/1998 | Ito et al. .............................. 430/531 |
| 5,910,401 | * 6/1999 | Anderson et al. ................... 430/533 |

FOREIGN PATENT DOCUMENTS 63-234255   6/1988   (JP).

* cited by examiner

*Primary Examiner*—Janet Baxter
*Assistant Examiner*—Amanda C. Walke
(74) *Attorney, Agent, or Firm*—Nixon & Vanderhye P.C.

(57) ABSTRACT

A photographic polyester film and a manufacturing method therefor. The photographic polyester film includes a polyester base film, a primer layer formed of polyurethane resin on at least one surface of the polyester base film, and a subbing layer formed of a hydrophillic polymer on at least one surface of the primer layer. Also, a photosensitive layer may be stacked on the subbing layer. The photographic polymer film having the primer layer, the subbing layer and the photosensitive layer exhibits excellent interlayer adhesiveness between the hydrophobic polyester base film and the hydrophilic sensitive layer. Also, in the manufacture of the photographic polyester film, in particular, in the case of forming a subbing layer after a long time has passed from the formation of a primer layer, if a corona discharge treatment is performed on at least one surface of the polyester film with the primer layer prior to the formation of a subbing layer and then a high-temperature curing is performed after the formation of the subbing layer, the resulting photographic polyester film has a strong adhesiveness of the subbing layer to the primer layer.

20 Claims, No Drawings

PHOTOGRAPHIC POLYESTER FILM AND MANUFACTURING METHOD THEREFOR

BACKGROUND OF THE INVENTION

1. Field of the Invention

The present invention relates to a photographic polyester film and a manufacturing method therefor, and more particularly, to a photographic polyester film exhibiting good adhesiveness between a base film and a photosensitive layer, in which interlayer adhesiveness between a primer layer and a subbing layer can be maintained even if the base film with the primer layer is left for a long time before the subbing layer is formed on the primer layer, and a manufacturing method therefor.

2. Description of the Related Art

A photographic film consists of a hydrophobic base film such as a polyester film and a photosensitive layer formed on the base film. However, separation of the photosensitive layer from the polyester film is frequent during the entire process including development, fixation and washing. This is because the polyester film has strong hydrophobicity while most materials for the photosensitive layer, e.g., gelatin containing silver halide, have strong hydrophilicity, so the adhesiveness between the polyester film and the photosensitive layer is very weak.

Thus, research has been conducted to enhance the adhesiveness between the polyester film and the photosensitive layer. In a conventional method, a polyester film is pre-treated to form a primer layer on at least one surface of the base film, a subbing layer is formed on the primer layer with a natural polymer such as gelatin, and then a photosensitive layer is formed on the subbing layer.

Hereinafter, a conventional method for forming a subbing layer will be explained.

In general, the subbing layer is formed by an off-line method and an in-line method which are both in practical use and can be applied to the following prior art.

U.S. Pat. No. 3,545,972 discloses a method for manufacturing a photographic polyester film with an enhanced interlayer adhesiveness, in which a subbing layer is formed of a terpolymer consisting of alkyl acrylate or alkyl methacrylate, an aliphatic monomer having two or more reactive groups, and itaconic acid, fumaric acid, acrylic acid or methacrylic acid, and a water permeable photosensitive organic colloid is coated on the subbing layer. Also, a water permeable organic colloid material layer without photosensitivity may be formed between the subbing layer and the photosensitive organic colloid layer. An in-line coating method is used in the formation of the subbing layer, a biaxial drawing method in which drawing is performed widthwise after the subbing layer is formed on a lengthwise drawn polyester film.

U.S. Pat. No. 3,874,877 discloses a photographic polyester film having a primer layer which is formed of polyamide-epichlorohydrine resin on the polyester film, and a subbing layer and a photosensitive layer which are formed in sequence on the primer layer. Here, the subbing layer consists of a hydrophilic resin such as a vinyl copolymer with cellulose acetate phthalate, cellulose acetate maleate or maleic anhydride, or gelatin.

U.S. Pat. No. 4,002,802 discloses a method for manufacturing a photographic polyester film in which a primer layer is formed of a copolymer of vinylidene chloride and itaconic acid or an ion exchange resin on a polyester film, and a subbing layer is formed of a polymer resin.

Also, U.S. Pat. Nos. 4,052,528, 4,135,932, 4,167,593, 4,265,946, 4,328,283, 5,510,233 and 5,562,997 disclose a composition for a pre-treatment of a photographic polyester film. In particular, U.S. Pat. No. 4,052,528 discloses a pre-treatment composition containing a tetrapolymer consisting of vinylidene chloride, one selected from the group consisting of alkyl acrylate, alkyl methacrylate, one selected from the group consisting of vinyl acetate and acrylonitrile, a copolymerizable acid and a halogenacetic acid vinyl ester. U.S. Pat. No. 4,135,932 discloses a pre-treatment composition containing a copolymer of styrene and its derivative. U.S. Pat. No. 4,167,593 discloses a pre-treatment composition containing a copolymer of vinylidene chloride, methyl acrylate, itaconic acid and vinyl monomer, U.S. Pat. No. 4,265,946 discloses a pre-treatment composition containing a copolymer of diolefin monomer and vinyl monomer, and U.S. Pat. No. 4,238,283 discloses a pre-treatment composition containing a copolymer of glycidyl acrylate and hydroxy alkyl acrylate with a copolymerizable vinyl monomer. Also, U.S. Pat. No. 5,510,233 discloses a pre-treatment composition containing a substance obtained by curing polyurethane latex with epoxy compound or dichlorotriazine derivative, and U.S. Pat. No. 5,562,997 discloses a pre-treatment composition containing (1) a polymer having carboxyl group at its main chain and a polymer having $SO_3X$ or $PO_3XY$ group (where X and Y are independently alkali metal, ammonium or hydrogen), (2) a polymer having carboxyl group at its main chain and $SO_3X$ or $PO_3XY$ group at its side chain, or (3) a compound having at least two free hydroxy groups.

In particular, the pre-treatment composition containing vinylidene chloride is the best at enhancing adhesiveness between a polyester base film and a photosensitive layer. However, there is a problem in that the composition can not be applied to an in-line coating method.

That is, when the composition containing vinyllidene chloride is coated on a polyester film by the in-line coating method, the intrinsic physical properties of the composition changes during drawing, so the surface properties of the pre-treated coating layer also change, thereby decreasing the adhesiveness between the base film and a photosensitive layer. To solve this problem, a method of increasing the content of a vinyl or acryl copolymerizable component has been suggested. However, it is not possible to secure a satisfactory interlayer adhesiveness by this method, and it is possible to reuse the film due to vinyllidene chloride.

The second preferred pre-treatment composition, other than vinyllidene chloride, contains acryl polymer. The surface properties of the film formed of this composition change less during drawing and there is less restriction relating to the reusing of the film. However, enhancement in the interlayer adhesiveness is trivial.

SUMMARY OF THE INVENTION

To solve the above problems, it is an object of the present invention to provide a polygraphic polyester film and a manufacturing method therefor, which has good interlayer adhesiveness between a base film and a photosensitive layer and in which adhesiveness between a subbing layer and a primer layer is good even if the primer layer formed on the base film is left for a long time before the subbing layer is formed thereon.

According to an aspect of the object of the present invention, there is provided a photographic polyester film comprising: a polyester base film; a primer layer formed of polyurethane resin on at least one surface of the polyester base film; and a subbing layer formed of a hydrophillic polymer on at least one surface of the primer layer.

Preferably, the polyurethane resin is a polyester series polyurethane having a polyester soft segment, a polyether series polyurethane having a polyether soft segment or a mixture thereof, and the hydrophilic polymer is a cross-linked gelatin or a cross-linked polyvinyl alcohol.

Preferably, the polyester soft segment is the product of condensation between at least one aliphatic dicarboxylic acid selected from the group consisting of succinic acid, adipic acid, sebacic acid, phthalic acid and maleic acid, and at least one aliphatic diol selected from the group consisting of ethylene glycol, diethylene glycol, propylene glycol, tetramethylene glycol, pentamethylene glycol, hexamethylene glycol and neopentyl glycol.

Preferably, the polyether soft segment is at least one condensation product selected from the group consisting of ethylene glycol, diethylene glycol, propylene glycol, tetramethylene glycol, pentamethylene glycol, hexamethylene glycol, neopentyl glycol, ethylene oxide, propylene oxide, glycerin, trimethylol propane, sorbitol and sorbitan.

According to another aspect of the object of the present invention, there is provided a method for manufacturing a photographic polyester film, comprising the steps of: (a) reacting a polyol with a polyisocyanate to prepare a first prepolymer having two isocyanate groups at its both end; (b) adding the first prepolymer in a hydrophilic solvent and then bisulfite to the mixture to prepare a second prepolymer in which isocyanate groups at its both end are blocked by bisulfite, resulting in a primer layer forming composition comprising the second prepolymer; (c) depositing the primer layer forming composition on at least on surface of the polyester base film and heating the resulting structure at 60~250° C. to form a primer layer of polyurethane resin; and (d) forming a subbing layer of a hydrophilic polymer on at least one surface of the primer layer of polyurethane resin.

Preferably, the method for manufacturing a photographic polyester film further comprises a step of forming a photosensitive layer of gelatin containing silver halide on at least one surface of the subbing layer after the step (d). Preferably, a corona discharge treatment is performed on at least one surface of the polyester film formed in the step (c) before the step (d) and a curing is performed at 120~180° C. after the step (d).

Preferably, the polyol is polyester series polyol, polyether series polyol or a mixture thereof.

Preferably, the polyester series polyol is produced by condensing at least one aliphatic dicarboxylic acid selected from the group consisting of succinic acid, adipic acid, sebacic acid, phthalic acid and maleic acid, and at least one aliphatic diol selected from the group consisting of ethylene glycol, diethylene glycol, propylene glycol, tetramethylene glycol, pentamethylene glycol, hexamethylene glycol and neopentyl glycol.

Preferably, the polyether series polyol is produced by condensing at least one selected from the group consisting of ethylene glycol, diethylene glycol, propylene glycol, tetramethylene glycol, pentamethylene glycol, hexamethylene glycol, neopentyl glycol, ethylene oxide, propylene oxide, glycerin, trimethylol propane, sorbitol and sorbitan.

Preferably, the polyisocyanate is at least one selected from the group consisting of toluene diisocyanate, xylene diisocyanate, phenylene diisocyanate, 4,4-diphenylmethane diisocyanate, tetramethylene diisocyanate, hexamethylene diisocyanate and trimethylhexamethylene diisocyanate.

DESCRIPTION OF THE PREFERRED EMBODIMENTS

A photographic polyester film according to the present invention comprises a polyester base film, a primer layer formed of polyurethane resin on at least one surface of the base film, and a subbing layer formed of cross-linked gelatin or polyvinyl alcohol on at least one surface of the primer layer. Here, the cross-linked gelatin or polyvinyl alcohol is obtained by reacting gelatin or polyvinyl alcohol with formaldehyde or methylolurea. Then, a photosensitive layer is further formed of gelatin containing silver halide on at least one surface of the subbing layer, thereby completing a photographic film. The photographic film having the above structure according to the present invention has good interlayer adhesiveness among the hydrophilic base film, the primer layer, the subbing layer and the hydrophilic photosensitive layer.

In the photographic film according to the present invention, the adhesiveness between the subbing layer and the primer layer can be maintained even if the subbing layer is formed on the primer layer after a large amount of time has lapsed from the formation of the primer layer on the base film. That is, a corona discharge treatment is performed on the primer layer, the subbing layer is formed thereon, and the resulting polyester film is cured at 120~180° C., so the adhesiveness between the primer layer and the subbing layer formed thereon is maintained.

Hereinafter, a method for manufacturing a photographic polyester film according to the present invention will be described in detail.

Firstly, in a step of forming a primer layer on a polyester base film, a polyol is reacted with a polyisocyanate to form a first prepolymer having isocyanate groups at its both ends. The polyol may be polyester series polyol, polyether series polyol or a mixture thereof. The polyester series polyol is preferably obtained through condensation between at least one aliphatic dicarboxylic acid selected from the group consisting of succinic acid, adipic acid, sebacic acid, phthalic acid and maleic acid, and at least one aliphatic diol selected from the group consisting of ethylene glycol, diethylene glycol, propylene glycol, tetramethylene glycol, pentamethylene glycol, hexamethylene glycol and neopentyl glycol.

The polyester series polyol is obtained through condensation of one or more materials selected from the group consisting of ethylene glycol, diethylene glycol, propylene glycol, tetramethylene glycol, hexamethylene glycol, neopentyl glycol, ethylene oxide, propylene oxide, glycerin, trimethylol propane, sorbitol and sorbitan.

The polyisocyanate contains at least one selected from the group consisting of toluene diisocyanate, xylene diisocyanate, phenylene diisocyanate, 4,4'-diphenyl diisocyanate, tetramethylene diisocyanate, hexamethylene diisocyanate and trimethylhexamethylene diisocyanate.

The first prepolymer having isocyanate groups at its both ends may be synthesized by a general method. However, to enhance the effect of the present invention, the content of isocyanate groups is 2~35 wt % based on the molecular weight of the first prepolymer, and more preferably, 3~15 wt %. If the content of isocyanate groups are less than 2 wt %, it is not possible to add bisulfite to the first prepolymer as much as required to provide solubility in water or thermal reactivity to the second prepolymer. If the content of isocyanate groups exceeds 35 wt %, solubility in water of the second prepolymer is too large and the content of inorganic salt becomes excessive, so that the adhesiveness between the polyester base film and the primer layer is decreased instead.

Subsequently, after diluting the first prepolymer with a small amount of hydrophilic solvent, an aqueous bisulfite solution is added, which is obtained by dissolving bisulfite such as sodium bisulfite, potassium bisulfite or ammonium bisulfite in water. As a result, a second prepolymer in which isocyanate groups at its both ends are blocked by bisulfite is formed, and a primer layer forming composition including the second prepolymer is prepared. Preferably, water is used for the hydrophilic solvent.

Here, due to a higher reactivity of the isocyanate group with bisulfite than with water, the second prepolymer has water solubility or dispersibility in water. When the second prepolymer is coated on a hydrophobic base film such as polyester base film, the second prepolymer deteriorate the hydrophobicity of the base film, thereby strengthening the adhesiveness with a hydrophillic photosensitive layer.

Also, in the preparation of the first prepolymer, polyester series polyol and polyether series polyol may be mixed, which exhibits strong adhesiveness with a gelating layer regardless of the mixing ratio. Preferably, a mixed weight ratio of polyether series polyol and polyester series polyol is 50:100~150:100, in which both dry and wet adhesiveness to the gelatin layer, more particularly the wet adhesiveness, are strong.

Then, the primer layer forming composition is deposited on at least one surface of a polyester base film such as polyethylene terephthalate (PET) film, and then heated at 60~250° C. By the heating, bisulfite is dissociated and reproduced isocyanate group of the second prepolymer reacts with a compound containing active hydrogen such as water, resulting in forming a primer layer consisting of a cross-linked polyurethane with urethane bond, urea bond and the like.

Then, a subbing layer forming composition in which a water-soluble gelatin or polyvinyl alcohol is mixed with formaldehyde or methylol urea is deposited on at least one surface of the primer layer, and then heated at 60~180° C. to form a subbing layer consisting of a cross-linked gelatin or polyvinyl alcohol. The formed subbing layer is strongly adhered to the primer layer formed of polyurethane resin. It is surmised that the reason for the strong adhesiveness of the subbing layer on the primer layer is that gelatin or polyvinyl alcohol consisting the subbing layer contains active hydrogen capable of reacting with isocyanate group of the second prepolymer for forming the primer layer.

Then, a photoresist layer is formed of gelatin mixed with silver halide on at least one surface of the subbing layer, to complete a photographic polyester film.

However, in a case where the subbing layer and the photosensitive layer are formed in sequence on the primer layer after 7 days or more have passed from the formation of the primer layer, the interlayer adhesiveness is not strong so that the subbing and/or photosensitive layer are separated easily from the base film during handling of the film. The present invention solves this problem.

That is, after a long time, 7 days or more, has passed from the formation of the primer layer, a corona discharge treatment is performed on the primer layer and then a subbing layer is formed by the above-described method. Here, if the polyester film is dried and cured at 120~180° C., the interlayer adhesiveness does not deteriorate even after 7 days or more have passed since the formation of the primer layer.

In the manufacturing method of a photographic polyester film according to the present invention, if the primer layer is formed by an in-line coating method, the subbing layer may be coated by either an in-line method or an off-line method. However, if the primer layer is formed by an off-line method, it is preferable to form the subbing layer by the same off-line method.

Hereinafter, the above three cases of forming a photographic polyester film will be described in detail.

(1) A case of using the in-line coating method for both a primer layer and a subbing layer Either dimethylterephthalate or telephthalic acid is condensed and polymerized with ethylene glycol to synthesize polyethylene terephtalate (PET) and then processed in the form of a sheet by an extruder. Then, the primer layer forming composition is deposited on at least one surface of PET sheet for the thickness of primer layer reaches approximately 1~10 $\mu$m after drying and then dried at a temperature in the range of 80~160° C. using infrared rays or hot air, to form a primer layer, the PET sheet with the primer layer is uniaxially drawn at 150° C. or more lengthwise up to three times.

Then, the subbing layer forming composition is deposited on at least one surface of the primer layer for the thickness of the subbing layer reaches approximately 2~4 $\mu$m after drying, and then dried at a temperature in the range of 80~160° C. using infrared rays or hot air and simultaneously drawn widthwise up to three times, resulting an a biaxially drawn film.

Then, a crystallization or a thermal treatment is performed to stabilize the thermal characteristics of the film. The formed film has surface properties suitable for coating of photosensitive emulsion or other hydrophilic substances.

However, when the primer layer and the subbing layer are formed continuously by the in-line method, there is no need for the corona discharge treatment on the base film with the primer layer before the subbing layer is formed. However, in the case where 7 or more days have passed from the formation of the primer layer, the corona discharge treatment is performed on the base film with the primer layer prior to the formation of the subbing layer, and then dried and cured at 120~180° C. in order to provide a film with good interlayer adhesiveness.

(2) A case of using the in-line coating method for the primer layer and the off-line coating method for the subbing layer Either dimethylterephthalate or telephthalic acid is condensed and polymerized with ethylene glycol to synthesize PET and then processed in the form of sheet by an extruder. Then, the PET sheet is drawn at 150° C. or more lengthwise up to three times, resulting in a uniaxially drawn PET film.

Then, the primer layer forming composition is deposited on at least one surface of the PET film for the thickness of the primer layer to be approximately 0.1~5.0 $\mu$m after drying and then dried at a temperature in the range of 80~160° C. using infrared rays or hot air and simultaneously drawn widthwise as much as approximately three times, resulting an a biaxially drawn film. Then, a crystallization or a thermal treatment is performed to stabilize the thermal characteristics of the film.

Then subbing layer forming composition is deposited on at least one surface of the polyester film with the primer layer by the inn-line coating method using a liquid accumulator and a coating roll whose temperature is set at 30~60° C., such that the thickness of the subbing layer reaches approximately 0.5~1.5 $\mu$m after drying, and then dried at a temperature in the range of 80~160° C. using infrared rays or hot air to form a subbing layer. The resulting film has surface characteristics suitable for coating of photosensitive emulsion or other hydrophilic substances.

In the case of forming the subbing layer in approximately 7 days from the formation of the primer layer, there is no need for a corona discharge treatment on the base film. However, in the case of forming the subbing layer after 7 or more days have passed from the formation of the primer layer, a corona discharge treatment is required on the base film with the primer layer and then the subbing layer must be formed thereon as soon as possible (at least in 1 day). Also, for a film with good interlayer adhesiveness, the resulting film with the subbing layer must be dried and cured at 120~180° C.

(3) A case of using the off-line coating method for both the primer layer and the subbing layer Either dimethylterephthalate or telephthalic acid is condensed and polymerized with ethylene glycol to synthesize PET and then processed in the form of a sheet by an extruder. Then, the PET sheet is drawn at 150° C. or more lengthwise up to three times, resulting in a uniaxially drawn PET film. The PET film is heated at a temperature in the range of 80~160° C. using infrared rays or hot air and simultaneously drawn widthwise up to three times, resulting in a biaxially drawn film. Then, a crystallization or a thermal treatment is performed to stabilize the thermal characteristics of the film, resulting in a transparent PET film.

Then, the primer layer forming composition is deposited on at least one surface of the PET film using a roll or myer bar method, such that the thickness of the primer layer is approximately 0.1~1.0 μm after drying, and then heated and cured at a temperature in the range of 80~160° C. using infrared rays or hot air.

Subsequently, the subbing layer forming composition is deposited on at least one surface of the PET film with the primer layer using a liquid accumulator and a coating roll whose temperature is set at 30~60° C., such that the thickness of the subbing layer reaches approximately 0.5~1.5 μm after drying, and then dried at a temperature in the range of 80~160° C. using infrared rays or hot air to form a subbing layer. The resulting film has surface characteristics suitable for coating of photosensitive emulsion or other hydrophilic substances.

In the case of forming the subbing layer in approximately 7 days from the formation of the primer layer, there is no need for a corona discharge treatment on the base film. However, in the case of forming the subbing layer and a photosensitive layer after 7 or more days have passed from the formation of the primer layer, a corona discharge treatment is required on the base film with the primer layer and then the subbing layer must be formed thereon as soon as possible (at least in 1 day). Also, for a film with good interlayer adhesiveness, the resulting film with the subbing layer must be dried and cured at 120~180° C.

In the manufacturing method for a photographic polyester film, processing conditions for each step is not limited to specific conditions. That is, any processing condition which is common to those skilled in the art can be applied to each step.

In particular, the method of forming the primer layer of polyurethane resin with the in-line coating method barely changes the intrinsic physical properties of the polyester film during recovery and reusing of the film. Thus, the method according to the present invention is economical as opposed to the conventional method in which the primer layer is formed of a composition containing vinyllidene chloride.

Hereinafter, the present invention will be described in detail through the following examples. However, the present invention is not limited to the following examples. Various performances of the films manufactured in the following examples were evaluated by the following methods.

(1) Dry adhesiveness

A photosensitive layer was coated on the base film such that a thickness of the photosensitive layer was approximately 2~3 μm after drying and dried at approximately 80° C., and a predetermined region of the photosensitive layer formed on the base film was scarred at predetermined intervals with a sharp-pointed metal. Then, a general adhesive tape was attached to the scarred region and then abruptly separated from the region, and the sensitive layer was examined to determine whether the sensitive layer was separated together with the adhesive tape, and the degree of separation of the sensitive layer was investigated. Then, the dry adhesiveness was rated as having one of three grades:

good: the photosensitive layer was not separated at all,
moderate: the photosensitive layer was partially separated,
poor: most of the photosensitive layer was separated.

(2) Wet adhesiveness

A photosensitive layer was coated on the base film such that the thickness of the photosensitive layer was approximately 2~3 μm after drying and dried at approximately 80° C., and then the resulting film was soaked in water or alkali solution. Then, the film was pulled out of the soaking solution, and a predetermined region of the photosensitive layer was scarred at predetermined intervals with a sharp-pointed metal. Then, the scarred region was rubbed using the finger or an elastic object 20 times, and the sensitive layer was examined to determine whether the sensitive layer was separated due to the rubbing, and the degree of separation of the sensitive layer were investigated. Then, the wet adhesiveness was rated as having one of six grades:

A: the photosensitive layer did not separate at all,
B: the photosensitive layer separated partially and minutely;
C: the photosensitive layer slightly separated;
D: the photosensitive layer somewhat separated;
E: most of the photosensitive layer separated;
F: the photosensitive layer completely separated.

<EXAMPLE 1>

30 parts by weight of a thermocurable polyester series urethane precursor (ELASTRON H-3, Cheil Industrial Pharmaceutical Co.) and 5 parts by weight of a catalyst (ELASTRON CATALYST 64, Cheil Industrial Pharmaceutical Co.) capable of dissociating blocked isocyanate groups of the polyester series urethane precursor were mixed. Then, 100 parts by weight of distilled water was added to the mixture and silica was added so as to control the surface roughness of the film. Then, sodium bicarbonate was added slowly to adjust the pH of the mixture to 5–6, to prepare a primer layer forming composition.

The primer layer forming composition was coated on at least one surface of a biaxially drawn PET film to a thickness of approximately 10 g/m$^2$ (before drying) using a myer bar, and then dried in an oven, the temperature of which was set to 180° C. at a rate of 60 m/min, resulting in a primer layer (off-line coating method).

Then, 100 parts by weight of gelatin was added to 1700 parts by weight of distilled water and then heated to 45° C. to melt, and 1 parts by weight of methanol and 9 parts by weight of formaldehyde were added to the mixture, to prepare a gelatin solution which was the composition for a subbing layer. Then, the gelating solution was coated on the primer layer to a thickness of approximately 1 g/1 m$^2$ (after drying) using a myer bar, and then dried in an oven, the temperature of which was set to 160° C. at a rate of 50 m/min, resulting in a subbing layer (off-line coating method).

Then, a photosensitive layer consisting of gelatin containing silver halide was coated on the resulting film obtained by the above process, and then dried at 50° C. for 30 minutes, resulting in a photographic film.

<EXAMPLE 2>

100 parts by weight of a thermocurable polyester series urethane precursor (ELASTRON H-3, Cheil Industrial Pharmaceutical Co.) and 5 parts by weight of catalyst (ELASTRON CATALYST 64, Cheil Industrial Pharmaceutical Co.) capable of dissociating blocked isocyanate groups of the polyester series urethane precursor were mixed. Then, 100 parts by weight of distilled water was added to the mixture and silica was added to the resultant. Then, sodium bicarbonate was added slowly to adjust the pH of the mixture to 5–6, to prepare a primer layer forming composition.

The primer layer forming composition was coated on at least one surface of a uniaxially drawn PETfilm to a thickness of approximately 10 g/m$^2$ (before drying) using a myer bar, and then dried in an oven, the temperature of which was set to 180° C. at a rate of 60 m/min. Then, the resulting layer was drawn in a vertical direction to the uniaxial drawing and then exposed to a thermal fixation, resulting in a primer layer (in-line coating method).

Then, 100 parts by weight of gelatin was put in 1700 parts by weight of distilled water and then heated at 45° C. to melt, and then 1 part by weight of methanol and 9 parts by weight of formaldehyde were added to the mixture to prepare a gelatin solution. The gelatin solution was coated on the primer layer to a thickness of approximately 1 g/m$^2$ (after drying) using a myer bar, and then dried in an oven, the temperature of which was set to 160° C. at a rate of 50 m/min, resulting in a subbing layer (off-line coating method).

Then, a photosensitive layer consisting of gelatin containing silver halide was coated on the resulting film obtained by the above process, and then dried at 50° C. for 30 minutes, resulting in a photographic film.

<EXAMPLE 3>

100 parts by weight of a thermocurable polyester series urethane precursor (ELASTRON H-3, Cheil Industrial Pharmaceutical Co.), 5 parts by weight of catalyst (ELASTRON CATALYST 64, Cheil Industrial Pharmaceutical Co.) capable of dissociating blocked isocyanate groups of the polyester series urethane precursor were mixed. Then, 100 parts by weight of distilled water was added to the mixture and silica was added to the resultant. Then, sodium bicarbonate was added slowly to adjust the pH of the mixture to 5–6, to prepare a primer layer forming composition.

The primer layer forming composition was coated on at least one surface of a casted PETfilm to a thickness of approximately 30 g/m$^2$ (before drying) using a myer bar, and then dried in an oven, the temperature of which was set to 180° C. at a rate of 60 m/min. Subsequently, the resulting layer was uniaxially drawn, resulting in a primer layer on the PETfilm (in-line coating method).

Then, 100 parts by weight of gelatin was put in 1700 parts by weight of distilled water and then heated at 450° C. to melt, and then 1 part by weight of methanol and 9 parts by weight of formaldehyde were added to the mixture to prepare a gelatin solution. The gelatin solution was coated on the drawn primer layer to a thickness of approximately 3 g/m$^2$ (after drying) using a myer bar, and then dried in an oven, the temperature of which was set to 180° C. at a rate of 50 m/min and simultaneously drawn in a vertical direction to the uniaxial drawing and exposed to a thermal fixation, resulting in a subbing layer (in-line coating method).

Then, a photosensitive layer consisting of gelatin containing silver halide was coated on the resulting film obtained by the above process, and then dried at 50° C. for 30 minutes, resulting in a photographic film.

<EXAMPLE 4>

15 parts by weight of a thermocurable polyester series urethane precursor (ELASTRON H-3, Cheil Industrial Pharmaceutical Co.), 15 parts by wight of a polyether series urethane precursor (ELASTRON H-38, Cheil Industrial Pharmaceutical Co.), 5 parts by weight of catalyst (ELASTRON CATALYST 64, Cheil Industrial Pharmaceutical Co.) capable of dissociating blocked isocyanate groups of the precursors, 100 parts by weight of distilled water, and silica were mixed. Then, sodium bicarbonate was added slowly to adjust the pH of the mixture to 5–6, to prepare a primer layer forming composition.

The primer layer forming composition was coated on at least one surface of a biaxially drawn PETfilm to a thickness of approximately 10 g/m$^2$ (before drying) using a myer bar, and then dried in an oven, the temperature of which was set to 180° C. at a rate of 60 m/min, resulting in a primer layer (off-line coating method).

Then, 100 parts by weight of gelatin was added to 1700 parts by weight of distilled water and then heated to 45° C. to melt, and 1 part by weight of methanol and 9 parts by weight of formaldehyde were added to the mixture, to prepare a gelatin solution. Then, the gelating solution was coated on the primer layer to a thickness of approximately 1 g/1 m$^2$ (after drying) using a myer bar, and then dried in an oven, the temperature of which was set to 160° C. at a rate of 50m/min, resulting in a subbing layer (off-line coating method).

Then, a photosensitive layer consisting of gelatin containing silver halide was coated on the resulting film obtained by the above process, and then dried at 50° C. for 30 minutes, resulting in a photographic film.

<EXAMPLE 5>

50 parts by weight of a thermocurable polyester series urethane precursor (ELASTRON H-3, Cheil Industrial Pharmaceutical Co.), 50 parts by weight of a polyether series urethane precursor (ELASTRON H-38, Cheil Industrial Pharmaceutical Co.) and 5 parts by weight of catalyst (ELASTRON CATALYST 64, Cheil Industrial Pharmaceutical Co.) capable of dissociating blocked isocyanate groups of the presursors were mixed. Then, 100 parts by weight of distilled water and silica were added to the mixture, and then sodium bicarbonate was added slowly to adjust the pH of the mixture to 5–6, to prepare a primer layer forming composition.

The primer layer forming composition was coated on at least one surface of a uniaxially drawn PETfilm to a thickness of approximately 10 g/m$^2$ (before drying) using a myer bar, and then dried in an oven, the temperature of which was set to 180° C. at a rate of 60 m/min. Then, the resulting layer was drawn in a vertical direction to the uniaxial drawing and then exposed to a thermal fixation, resulting in a primer layer (in-line coating method).

Then, the gelatin solution of Example 4 was coated on the primer layer to a thickness of approximately 1 g/m² (after drying) using a myer bar, and then dried in an oven, the temperature of which was set to 160° C. at a rate of 50 m/min, resulting in a subbing layer (off-line coating method).

Then, a photosensitive layer consisting of gelatin containing silver halide was coated on the resulting film obtained by the above process, and then dried at 50° C. for 30 minutes, resulting in a photographic film.

<EXAMPLE 6>

The primer layer forming composition of Example 5 was coated on at least one surface of PET film to a thickness of approximately 30 g/m² (before drying) using a myer bar and then heated in an oven, the temperature of which was set to 180° C. at a rate of 50 m/min, and simultaneously uniaxially drawn to form a primer layer (in-line coating method).

Then, the gelatin solution of Example 4 was coated on the primer layer to a thickness of approximately 3 g/m² (after drying) and then dried in an oven, the temperature of which was set to 180° C. at a rate of 50 m/min, and simultaneously drawn in a vertical direction to the uniaxial drawing to form a subbing layer (in-line coating method).

Then, a photosensitive layer consisting of gelatin containing silver halide was coated on the resulting film obtained by the above process, and then dried at 50° C. for 30 minutes, resulting in a photographic film.

<EXAMPLE 7>

15 parts by weight of a thermocurable polyester series urethane precursor (ELASTRON H-3, Cheil Industrial Pharmaceutical Co.), 15 parts by weight of a polyether series urethane precursor (ELASTRON H-38, Cheil Industrial Pharmaceutical Co.), 5 parts by weight of catalyst (ELASTRON CATALYST 64, Cheil Industrial Pharmaceutical Co.) capable of dissociating blocked isocyanate groups of the presursors, 100 parts by weight of distilled water, and silica were mixed. Then, sodium bicarbonate was added slowly to adjust the pH of the mixture to a 5–6, to prepare a primer layer forming composition.

The primer layer forming composition was coated on at least one surface of a biaxially drawn PET film to a thickness of approximately 10 g/m² (before drying) using a myer bar, and then dried in an oven, the temperature of which was set to 180° C. at a rate of 60 m/min, resulting in a primer layer (off-line coating method).

After 7 days passed from the formation of the primer layer, a corona discharge treatment (at a rate of 90 m/min and with a discharging current of 20 A) was performed on the primer layer and then the subbing layer was formed in 24 hours as follows.

100 parts by weight of gelatin was added to 1700 parts by weight of distilled water and then heated to 450° C. to melt, and 1 part by weight of methanol and 9 parts of weight of formaldehyde were added to the mixture, to prepare a gelatin solution. Then, the gelatin solution was coated on the primer layer to a thickness of approximately 1 g/1 m² (after drying) using a myer bar, and then dried in an oven, the temperature of which was set to 160° C. at a rate of 50 m/min, resulting in a subbing layer (off-line coating method). Then, the film was cured at a temperature of 180° C.

Then, a photosensitive layer consisting of gelatin containing silver halide was coated on the resulting film obtained by the above process, and then dried at 50° C. for 30 minutes, resulting in a photographic film.

<EXAMPLE 8>

50 parts by weight of a thermocurable polyester series urethane precursor (ELASTRON H-3, Cheil Industrial Pharmaceutical Co.), 50 parts by weight of a polyether series urethane precursor (ELASTRON H-38, Cheil Industrial Pharmaceutical Co.), 5 parts by weight of catalyst (ELASTRON CATALYST 64, Cheil Industrial Pharmaceutical Co.) capable of dissociating blocked isocyanate groups of the precursors, 100 parts by weight of distilled water, and silica were mixed. Then, sodium bicarbonate was added slowly to adjust the pH of the mixture to 5–6, to prepare a primer layer forming composition.

The primer layer forming composition was coated on at least one surface of a uniaxially drawn PET film to a thickness of approximately 10 g/m² (before drying) using a myer bar, and then dried in an oven, the temperature of which was set to 180° C. at a rate of 60 m/min. Then, the resulting layer was drawn in a vertical direction to the uniaxial drawing and then exposed to a thermal fixation, resulting in a primer layer (in-line coating method).

After 7 days from the formation of the primer layer, a corona discharge treatment (at a rate of 90 m/min and with a discharging current of 20 A) was performed on the primer layer and then the subbing layer was formed in 24 hours by the same method as in Example 7 (off-line coating method). Then, the film was cured at a temperature of 180° C.

Then, a photosensitive layer consisting of gelatin containing silver halide was coated on the resulting film obtained by the above process, and then dried at 50° C. for 30 minutes, resulting in a photographic film.

<COMPARATIVE EXAMPLES 1 THROUGH 6>

Photographic films were manufactured by the same methods as in Examples 1 through 6 except the primer layer was not formed.

<COMPARATIVE EXAMPLES 7 AND 8>

Photographic films were manufactured by the same methods as in Examples 7 and 8 except prior to the formation of the subbing layer after 7 days have passed from the formation of the primer layer, the corona discharge treatment was not performed on the primer layer.

<COMPARATIVE EXAMPLES 9 AND 10>

Photographic films were manufactured by the same methods as in Examples 7 and 8 except the primer layer was not formed.

<COMPARATIVE EXAMPLES 11 AND 12>

Photographic films were manufactured by the same methods as in Comparative Examples 7 and 8 except the primer layer was not formed.

Dry and wet adhesiveness of the photographic films manufactured by Examples 1 through 8 and Comparative Examples 1 through 12 were investigated and the results were as shown in Table 1.

TABLE 1

| examples | existence of primer layer | adhesiveness | |
|---|---|---|---|
| | | dry adhesiveness | wet adhesiveness |
| Example 1 | yes | good | A |
| Example 2 | yes | good | A |
| Example 3 | yes | good | A |
| Example 4 | yes | good | A |
| Example 5 | yes | good | A |
| Example 6 | yes | good | A |
| Example 7 | yes | good | A |
| Example 8 | yes | good | A |
| Comparative Example 1 | no | poor | F |
| Comparative Example 2 | no | poor | F |
| Comparative Example 3 | no | poor | F |
| Comparative Example 4 | no | poor | F |
| Comparative Example 5 | no | poor | F |
| Comparative Example 6 | no | poor | F |
| Comparative Example 7 | yes | moderate | D |
| Comparative Example 8 | yes | moderate | D |
| Comparative Example 9 | no | poor | F |
| Comparative Example 10 | no | poor | F |
| Comparative Example 11 | no | poor | F |
| Comparative Example 12 | no | poor | F |

As shown in Table 1, in Examples 1 through 6 in which the subbing and photosensitive layers were formed on the primer layer of polyurethane resin formed on the polyester base film, dry and wet adhesiveness were both good. On the contrary, in Comparative Examples 1 through 6 in which the subbing and photosensitive layers are formed directly on the polyester base film without the polyurethane resin primer layer, the dry and wet adhesiveness were both poor.

Also, as in Examples 7 and 8 in which the subbing layer was formed after 7 days from the formation of the primer layer, similar dry and wet adhesiveness to the case where the primer layer and subbing layer are formed in sequence by an in-line coating method can be obtained by performing a corona discharge treatment and a high temperature curing.

On the contrary, in the case of directly forming the subbing layer on the primer layer after 7 days have passed without performing a corona discharge treatment and a curing at a high temperature as in Comparative Examples 7 and 8, it is clear that the dry and wet adhesiveness decrease to "moderate" and D grades, respectively. Also, in the case of not forming the primer layer (Comparative Examples 9 through 12), the dry and wet adhesiveness are both poor even if the corona discharge treatment and the curing at a high temperature are performed.

As described above, in the photographic film according to the present invention having a primer layer formed of polyurethane resin, a subbing layer formed of a cross-linked gelatin or a cross-linked polyvinyl alcohol and a photosensitive layer, which are stacked in sequence on a polyester film, the interlayer adhesiveness between the hydrophobic polyester base film and the hydrophilic photosensitive layer is excellent.

Also, in the case of forming a subbing layer after a long time has passed from the formation of a primer layer, if a corona discharge treatment is performed on at least one surface of the polyester film with the primer layer prior to the formation of a subbing layer and then a high-temperature curing is performed after the formation of the subbing layer, the resulting photographic polyester film exhibits a strong adhesiveness of the subbing layer to the primer layer.

What is claimed is:

1. A photographic polyester film comprising:
    a polyester base film;
    a primer layer formed of polyurethane resin on at least one surface of the polyester base film; and
    a subbing layer formed of a hydrophilic polymer which is a cross-linked gelatin or a cross-linked polyvinyl alcohol on at least one surface of the primer layer.

2. The photographic polyester film of claim 1, further comprising a photosensitive layer formed of gelatin containing silver halide on at least one surface of the subbing layer.

3. The photographic polyester film of claim 1, wherein the polyurethane resin is a polyester series polyurethane having a polyester soft segment, a polyether series polyurethane having a polyether soft segment or a mixture thereof.

4. The photographic polyester film of claim 3, wherein the polyester soft segment is the product of condensation between at least one aliphatic dicarboxylic acid selected from the group consisting of succinic acid, adipic acid, sebacic acid, phthalic acid and maleic acid, and at least one aliphatic diol selected from the group consisting of ethylene glycol, diethylene glycol, propylene glycol, tetramethylene glycol, pentamethylene glycol, hexamethylene glycol and neopentyl glycol.

5. The photographic polyester film of claim 3, wherein the polyether soft segment is at least one condensation product selected from the group consisting of ethylene glycol, diethylene glycol, propylene glycol, tetramethylene glycol, pentamethylene glycol, hexamethylene glycol, neopentyl glycol, ethylene oxide, propylene oxide, glycerin, trimethylol propane, sorbitol and sorbitan.

6. A method for manufacturing a photographic polyester film, comprising the steps of:
    (a) reacting a polyol with a polyisocyanate to prepare a first prepolymer having two isocyanate end groups;
    (b) adding the first prepolymer in a hydrophilic solvent and then bisulfite to the mixture to prepare a second prepolymer in which the isocyanate end groups are blocked by bisulfite, resulting in a primer layer forming composition comprising the second prepolymer;
    (c) depositing the primer layer forming composition on at least one surface of the polyester base film and heating the resulting structure at 60–250° C. to form a primer layer of polyurethane resin;
    (d) forming a subbing layer of a hydrophilic polymer on at least one surface of the primer layer of polyurethane resin; and
    (e) after step (d), forming a photosensitive layer of gelatin containing silver halide on at least one surface of the subbing layer.

7. The method of claim 6, wherein the polyol is polyester series polyol, polyether series polyol or a mixture thereof.

8. The method of claim 7, wherein the polyester series polyol is produced by condensing at least one aliphatic dicarboxylic acid selected from the group consisting of succinic acid, adipic acid, sebacic acid, phthalic acid and maleic acid, and at least one aliphatic diol selected from the group consisting of ethylene glycol, diethylene glycol, propylene glycol, tetramethylene glycol, pentamethylene glycol, hexamethylene glycol and neopentyl glycol.

9. The method of claim 7, wherein the polyether series polyol is produced by condensing at least one selected from the group consisting of ethylene glycol, diethylene glycol, propylene glycol, tetramethylene glycol, pentamethylene glycol, hexamethylene glycol, neopentyl glycol, ethylene oxide, propylene oxide, glycerin, trimethylol propane, sorbitol and sorbitan.

10. The method of claim 6, wherein the polyisocyanate of the step (a) is at least one selected from the group consisting of toluene diisocyanate, xylene diisocyanate, phenylene diisocyanate, 4,4-diphenylmethane diisocyanate, tetramethylene diisocyanate, hexamethylene diisocyanate and trimethylhexamethylene diisocyanate.

11. The method of claim 6, wherein the content of isocyanate groups of the first prepolymer is 2~35 wt % based on the molecular weight of the first prepolymer.

12. The method of claim 6, wherein the bisulfite is at least one selected from the group consisting of sodium bisulfite, potassium bisulfite and ammonium bisulfite.

13. The method of claim 6, wherein a corona discharge treatment is performed on at least one surface of the polyester film formed in the step (c). before the step (d) and a curing is performed at 120~180° C. after the step (d).

14. The method of claim 13, further comprising a step of forming a photosensitive layer of gelatin containing silver halide on at least one surface of the subbing layer after the step (d).

15. The method of claim 13, wherein the polyol is polyester series polyol, polyether series polyol or a mixture thereof.

16. The method of claim 15, wherein the polyester series polyol is produced by condensing at least one aliphatic carboxylic acid selected from the group consisting of succinic acid, adipic acid, sebacic acid, phthalic acid and maleic acid, and at least one aliphatic diol selected from the group consisting of ethylene glycol, diethylene glycol, propylene glycol, tetramethylene glycol, pentamethylene glycol, hexamethylene glycol and neopentyl glycol.

17. The method of claim 15, wherein the polyether series polyol is produced by condensing at least one selected from the group consisting of ethylene glycol, diethylene glycol, propylene glycol, tetramethylene glycol, pentamethylene glycol, hexamethylene glycol, neopentyl glycol, ethylene oxide, propylene oxide, glycerin, trimethylol propane, sorbitol and sorbitan.

18. The method of claim 13, wherein the polyisocyanate of the step (a) is at least one selected from the group consisting of toluene diisocyanate, xylene diisocyanate, phenylene diisocyanate, 4,4-diphenylmethane diisocyanate, tetramethylene diisocyanate, hexamethylene diisocyanate and trimethylhexamethylene diisocyanate.

19. The method of claim 13, wherein the bisulfite is at least one selected from the group consisting of sodium bisulfite, potassium bisulfite and ammonium bisulfite.

20. The method of claim 13, wherein the content of isocyanate groups of the first prepolymer is 2–35 wt % based on the molecular weight of the first prepolymer bisulfite.

* * * * *